United States Patent [19]

Pitroda et al.

[11] Patent Number: 5,349,638
[45] Date of Patent: Sep. 20, 1994

[54] UNIVERSAL CALLING/ORIGINATING NUMBER IDENTIFICATION

[75] Inventors: Satyan G. Pitroda, Downers Grove, Ill.; Krishnappa Ranganath, Milwaukee, Wis.

[73] Assignee: Micro-Technology Inc.-Wisconsin, Menomonee Falls, Wis.

[21] Appl. No.: 8,513

[22] Filed: Jan. 25, 1993

[51] Int. Cl.⁵ ............... H04M 11/00; H04M 1/56
[52] U.S. Cl. .................... 379/142; 379/93; 379/98
[58] Field of Search ............ 379/142, 98, 93, 53; 348/14

[56] References Cited

U.S. PATENT DOCUMENTS

| | | | |
|---|---|---|---|
| 4,924,496 | 5/1990 | Figa et al. | 379/142 |
| 5,059,055 | 10/1991 | Hanle et al. | 379/142 |
| 5,185,787 | 2/1993 | Katz | 379/142 |
| 5,202,917 | 4/1993 | Wakai | 379/160 |
| 5,220,599 | 6/1993 | Sansano et al. | 379/142 |
| 5,255,183 | 10/1993 | Katz | 379/142 |

FOREIGN PATENT DOCUMENTS

| | | | |
|---|---|---|---|
| 0436345 | 7/1991 | European Pat. Off. | 379/53 |
| 0493084 | 7/1992 | European Pat. Off. | 379/53 |
| 0212056 | 8/1989 | Japan | 379/53 |

*Primary Examiner*—Stephen Chin
*Assistant Examiner*—Vijay Shankar
*Attorney, Agent, or Firm*—Robert J. Black

[57] ABSTRACT

An interface circuit used between a telephone office and a subscriber's telephone operated in response to signals identifying incoming calls to provide visual and/or audible indications of the identification information. The incoming signal information is also extended in decoded form to an associated computer, computer network, and/or television screen.

9 Claims, 2 Drawing Sheets

UNIVERSAL CALLING/ORIGINATING NUMBER IDENTIFICATION

BACKGROUND OF THE INVENTION

1. Field of the Invention

The present invention is drawn to subscriber telephone apparatus and more particularly to a caller identification device which displays the identity of calling parties.

2. Background Art

A search of the background art directed to the subject matter of the present invention conducted in the U.S. Patent and Trademark Office disclosed the following U.S. Pat. Nos. 4,672,660 4,805,207 4,817,133 4,894,861 4,926,471.

Many telephone companies throughout the world have now started offering so-called calling number display features (CND) as part of an optional feature service to regular telephone subscribers. In the United States, many of the major operating companies are offering this new service where the telephone subscriber may exercise an appropriate option is able to receive information to identify the calling party on a device which includes a display which can be attached to the telephone line. This service is available from local telephone companies at an additional monthly charge and requires an add-on hardware device at the customer's premise. Obviously, this feature allows the user to screen incoming calls and answer only when desired. At the present time, hardware to implement calling device in the form of a so-called black box device, or add-on, which would be connected to a normal telephone line provides this service. In the usual arrangement, the telephone system offering such service, sends from the telephone central office a set of signals during the ring cycle which are decoded at the customer premises and are displayed on the calling number display.

As indicated in the prior art calling number devices, the circuitry evaluates the ring cycle and decodes appropriate signals received through internal control logics in the calling number identification unit and then typically displays the information on a liquid crystal device. This unit, typically speaking, is attached to the tip and ring of the telephone line in parallel with the telephone instrument. It is the oh,jeer of the present invention to provide such service along with additional services, such as for the provision of conversion to audio signals, to computer ports for direct computer interface, and to normal television for display while watching programs. The unit may have true universality for an office as well as home use.

SUMMARY OF THE INVENTION

The present invention relates to a universal calling/originating number identification device where in addition to the usual display the calling party number is presented through an audible voice signal and is available in computerized form to be presented to an RS 232 type or equivalent format for direct interface to a personal or associated computer along with a calling party number display on the television screen. The audible voice signal is particularly useful to the subscriber when he or she is not directly adjacent to the visual display. With this feature, the originating number is translated into an audible voice signal and through voice message the number may be presented to the subscriber. The universal calling number identification device of the present invention also converts calling number identification into the computer format to directly interface with various local area networks and computers, such as PCs, lap tops, palm top, pen top, main frames, etc. By means of this feature, rather than just identifying the calling number on a display through an audible voice signal, an associated computer data base related to the calling number may be automatically accessed and all the relevant information, such as files, forms, etc., can be made available on the screen to the subscriber to thus improve substantially customer service, particularly in a business environment. Also included is a feature permitting "on- screen" display of calling numbers on a user's television set and a speakerphone.

The present invention relating to calling number identification information successfully utilizes this information with additional features or options which may be selected at any time. These features as indicated above include a normal visual display, an audible voice announcement of either the calling number or the calling party name and a computer interface to provide access to a data base or similar calling party information. Also included is a speakerphone circuit and a television interface designed to give caller identification information on the screen of a television set. This feature extracts caller data and displays it on the television screen which might be either directly integrated into a television circuit or interfaced externally using the caller identification device of the present invention.

As set forth, the present system consists of circuitry to decode signals from the ringing cycle for presentation to a microprocessor which controls all of the options. These options can be manipulated and managed for input or data entry for modification update through an associated keyboard in such a manner that a select group of numbers can be stored to allow selective ringing or the elimination of ringing.

The calling party identified number can also be compared with a set of numbers prestored to identify frequent calls and various other data for analysis. The microprocessor included also has access to synthesized voice unit which is able to relate numbers from "0" to "9" as stored in a read only memory which can be activated for the presentation of audible signals. It is also possible to program in the user's own voice as well as the name of the party to be announced through audible signals in piece of a normal seven digit telephone number. For example, if the calling number happens to be 963–1453, either this can be displayed on a liquid crystal display, a television screen or a corresponding voice signal can be generated which announces the numbers in sequence, such as 9, 6, 3, 1, 4, 5, 3, etc. If desired, a name such as "John Jones", associated with this number, can also be programmed. In this case, rather than the number, an audible voice signal will represent a name and a message and would say "John Jones calling, John Jones calling". This feature is of considerable value, particularly in the situation where cordless telephones may be in use. If the person is not present at the base station and rather is utilizing the wireless system in some location nearby, it may be possible to hear this incoming call which will then announce who is calling so that he can respond by utilizing the voice activated speakerphone or cordless telephone.

From a business standpoint, however, substantial advantage is provided by the present invention, particularly in an environment where a lot of incoming calls are required to be answered by a customer service department. The present unit will then convert the calling/originating number information into a series of computer signals which can be directly interfaced with the data base to retrieve relevant information onto the computer screen to assist in handling the incoming or outgoing customer's problems. For example, should someone being calling an insurance office relative to an insurance claim, the agent with a telephone and computer terminal will be able to pull up automatically, appropriate files from the computer before answering the telephone call. With this arrangement the telephone subscriber would be able to greet the calling party by saying "Good Morning, John Jones, I have all your necessary information on the screen -may I help you."

It is anticipated this will save substantial time on the telephone line to establish initial contact to give the introductory information and subsequently the operator would have to key in the customer's name or other information to pull the relevant information on the screen. Direct access with calling number identification information and interface with the data base would also reduce the time and improve productivity and at the same time enhance and improve overall customer service. It is anticipated it would eliminate routine conversation and data entry to derive the relevant information. With the new integrated device for universal caller number identification with display, voice announcement and a computer interface, a great deal of flexibility would be available for use at both home or office locations.

BRIEF DESCRIPTION OF THE DRAWINGS

A better understanding of the present invention may be had from a consideration of the following detailed description taken in conjunction with the accompanying drawings in which.

It should be noted that most of the components of the prior art and the present invention have been shown in block diagram form only. Inasmuch as most of the construction thereof are well known in the prior art and the details thereof do not form a portion of the present invention, it only being required that they perform the functions as described herein.

DESCRIPTION OF THE PREFERRED EMBODIMENT

Figure 1:
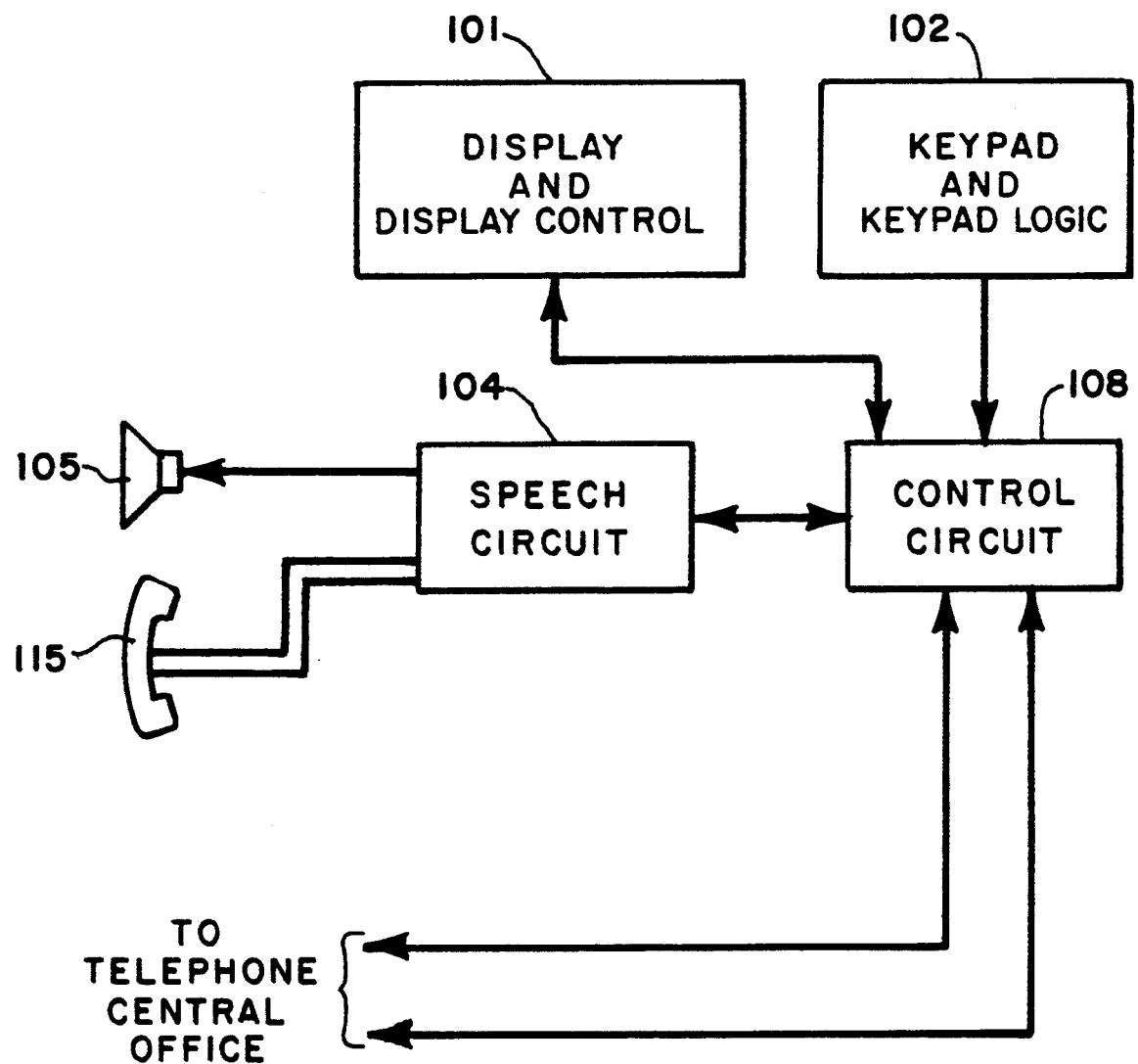
FIG. 1 is a figure of a calling party identification display and system in accordance with the prior art.

To better understand the present invention, the following description of the prior art will first be described. Referring now to FIG. 1, a typical telephone operation is shown with connection to a conventional telephone central office, which provides calling number identification service. This service is well known and is currently being offered by many of the major operating telephone companies in the United States. At these locations, the telephone subscriber has the option to receive information to identify calling party numbers typically speaking on a small device connected to the telephone line which provides a visual indication of the calling party number. This service is usually available at additional monthly cost and requires the add-on device. This particular features allows the user to screen incoming calls and answer only when desired. In a normal arrangement, the telephone central office transmits a set of signals during the ring cycle which are decoded at the customer's premises and are displayed as part of the calling number identification display feature.

Referring now to FIG. 1, a sample of this arrangement is shown in which control circuit 108 which controls transmission and reception of signals received over the subscriber's line interconnected to the telephone central office with the connection made by circuit connections extending to the central office. Via this connection, transmission and reception of voice signals and tones from the telephone subscriber's handset 113 to or from the subscriber's line, the transfer of dialed numbers to the central office as well as generation of tones which are heard over a small loudspeaker 105 or traditionally included in the subscriber's telephone as well as the display on a display device 101 of the calling party identifying number. Keypad and keypad logic 102 designates the number input circuitry provided with pushbuttons or dial in the usual manner as well as the associated logic circuitry which transmits the pushbutton or dialed numbers by the user to the communication control circuit 108. Handset 113 and associated speech circuit 104 convert voice signals to an electrical signal to be extended via the control circuit over the subscriber's line in the central office and also to convert incoming signals received over the line via the control circuit and speech circuit to the telephone receiver included in handset 113. Included in the speech circuit 104 is a tone generating circuit which causes speaker 105 to generate incoming alerting tones to indicate the presence of an incoming call. From the above arrangement all the elements shown with the exception of the display and display control circuit 101 and control circuit 108 are included in the telephone subscriber's terminal unit which is normally connected to a convenient outlet at the subscriber's location providing connections to the telephone central office. The subscriber's telephone arrangement shown in FIG. 1 is used for calling number identification under the following circumstances. In this particular instance the originating party's subscriber number is transferred from the originating number identifying communication network is received by communication control circuit 108 from which it is extended to display control circuit 101. The display control circuit 101 then displays the originating party's number on the display which is included as part of the display and control circuit 101. This typically includes a liquid crystal display or similar unit which will identify in visual form the numbers of the calling party.

Obviously, when the system as described above is utilized, the calling party's number appears on display 101 it is necessary for the subscriber at the telephone system shown in FIG. 1 if present to visually see and make a determination as to whether or not to answer or respond to the incoming call depending upon the displayed number. Thus, when the subscriber is not present directly at the telephone number, even though he may hear the alerting ringing signal received at speaker 105, he may not see the telephone number and cannot judge as to whether or not he should make a decision to respond to the incoming telephone call.

After reviewing the foregoing description of the prior art, it will be obvious that the present invention which shall now be described in detail provides substantial improvement with additional features over that found in the prior art.

It should be noted that circuit details have not been shown inasmuch as they do not form a portion of the present invention. It only being required that they provide the functions to operate in a manner which will be described hereinafter. Particular circuit details are well within the capability of being designed by those skilled in the art.

Figure 2:
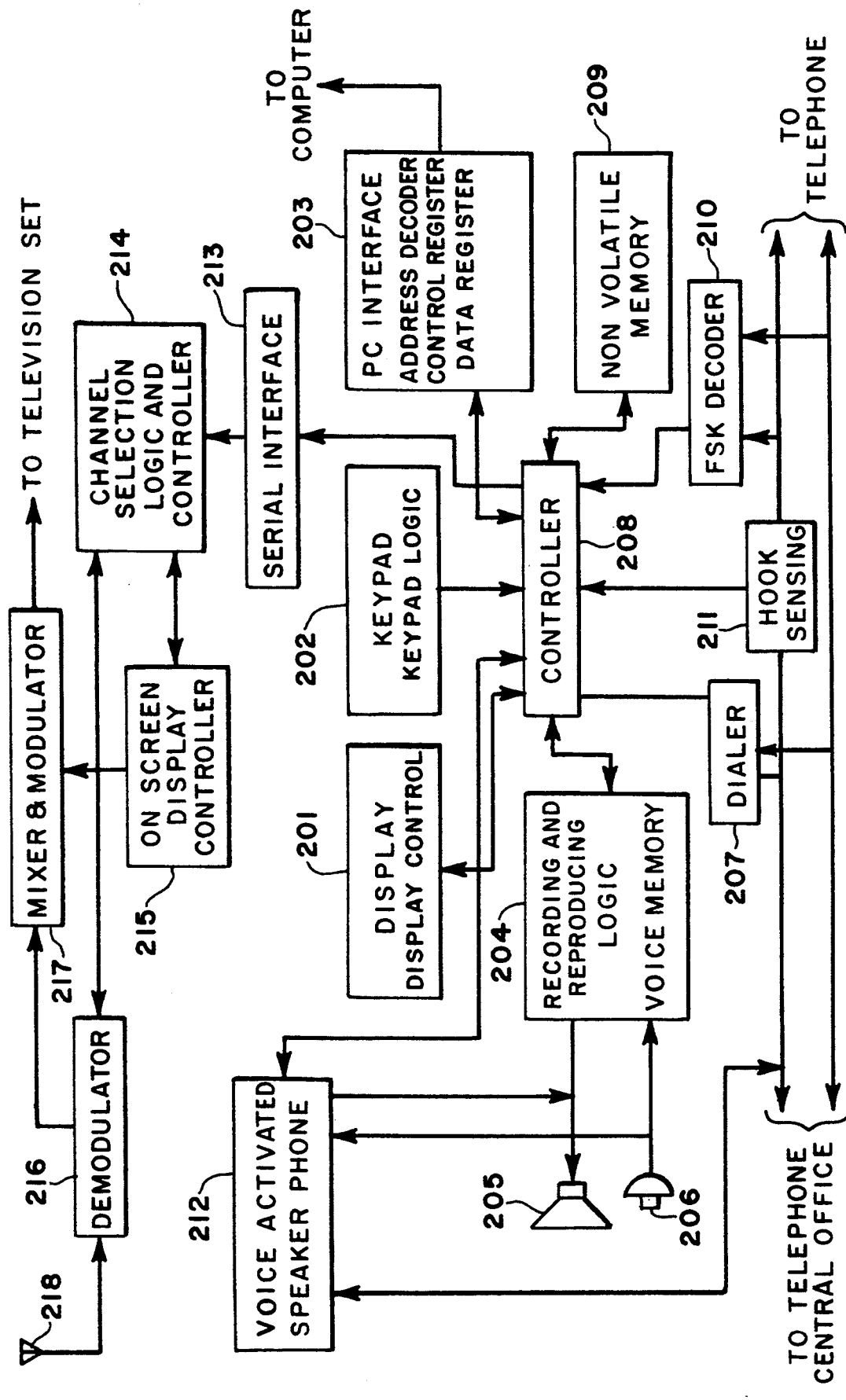
FIG. 2 is a universal calling and originating number identification system in accordance with the teachings of the present invention.

Referring now to FIG. 2, the display and display control units similar to that described above in connection with the description of the prior art typically speaking is a commercially available unit 201 that includes an LCD or similar technique for displaying messages and numbers as under control of the microcontroller 208. The keypad unit 202 consists of a 32 key alpha numeric keypad including some six optional keys as shown in FIG. 3. These optional keys are operated to provide special functions depending on multiple options displayed on the display unit. This unit is effectively used to convey selected key information to microcontroller 208.

A personal computer interface 203 includes two registers-a control register and a data register and a programmable address decoding logic utilizing its connection to the microcontroller to output line status as well as caller numbers to the personal computer. Of the two registers, the controller register assists in transfer of data and line status information, while the second or socalled data register is bidirectional which allows it to assist in data transfer between the microcontroller 208 and the personal computer interface 203.

The voice interface circuit 204 consisting of recording, logic and voice memory is based on commercially available integrated circuits. It is able to record and reproduce voice data and store the data utilizing a non-volatile memory which includes a battery backup. This voice interface 204 also includes a prerecorded voice chip providing voice synthenization, prerecorded information, such as numerals 0–9 and additional phraseology, such as call from, date and time.

The process of storing an entry of a voice sample involves microcontroller 208 recognize a request from the user to do so by input from keypad 202, in response to that input initiates a command to the recording and reproducing logic 204 to commence recording. At this time, the microcontroller 208 records the address at which this voice information is being written in voice memory. This information is then updated on the microcontroller memory. If the user speaks into microphone 206, his choice of a name relates to the information recorded in the voice memory and the index which is stored against the choice of a number is selected. The party whose number is that previously selected calls the user, the microcontroller compares the received number against the stored information contained therein. If a match is found, it announces the name by combination of synthesized voice, such as a "Call from Mr. Jones". If there is no match, it then may announce the call is from 123–4567, etc., where the numbers announced are the received numbers. If the user wishes to recall these logged entries, it announces first the name or number as "A call from Mr. Jones", or "123–4567", etc., then the call received as of date, e.g., "Sep. 16, 1992", the time as "3:49 PM". It is during dialing that this unit has the ability to announce digits being dialed, such as 123–4567, etc., and also to announce voice information it uses speaker 205 and an associated audio amplifier included in the recording and reproducing voice memory circuit 204.

A built-in dialer 207, along with an associated coupling transformer, dials out DTMF (dual tone multifrequency dialing) digits on the telephone lines extending to the telephone central office in a manner supplied and controlled by the microcontroller. Dialer 207 assists in the dialing of party numbers by their name, number or redial on an existing entry from a caller information log.

Microcontroller 208 with its internally stored program is responsible for all operations of the system of the present invention. Microcontroller 208 is interfaced with a non-volatile or battery backed memory 209. The controller is responsible for all data manipulation and control of all the other portions of the unit taught by the present invention. The frequency shift decoder 210 is responsible for the decoding of the caller number as transmitted from the telephone central office. This unit converts dual frequency information into binary information which is captured or stored and anaylzed by microcontroller 208. An optocoupler in hook sensing or line sensing unit 211 detects the state of the line for the controller as to whether the line is presently ringing, off-hook or in the on-hook condition. Based on information from the sensing circuit 11, microcontroller can decide which of the several Functions must be performed. The two modular connectors provide the necessary connection to the telephone central office and to the telephone itself, respectively. On operation, microcontroller 208 detects the state of the line and consequently the operation desired by the user by means of the line sensing circuit 211 and/or the keypad 202. After input from either sensing unit 211 or keypad 202, the microcontroller decides to do the requested operation. Should there be a request to dial a number, the microcontroller 208 then clears the display included therein and issues a command to the dialer unit 207 to dial a specific digit. This digit is then drawn from the stored memory portion and forwarded to the dialer by microcontroller 208. The dialer 207 converts this binary digit into a dual tone multiple frequency tone and extends this signal over the telephone line via a modular jack where it establishes a connection to the telephone central office. Once all the digits are transmitted, the microcontroller 208 will initiate a timer counter program to display the necessary time lapsed for the call.

On receipt of an incoming call, once ringing starts coming in on the telephone line from the telephone central office, sensing circuit 21.1 transmits this information to the microcontroller 208. Microcontroller 208 now initiates a program section which monitors the FSK decoder 210 for incoming frequency shifted key information. If any FSK signal is received, then FSK decoder 210 decodes this data, extending it to microcontroller 208 where it will be accepted as serial data. The microcontroller then looks for the proper sequence of data pattern to convert this serial data into a caller number. If there is an error-free caller number, the microcontroller will then search for that number in non-volatile memory 209. If there is a match, it then draws that number out and submits data in the form of either number or name to the display unit 201 for presentation to the telephone subscriber. If instead there is voice information required, then it will issue a command to the reproducing portion of 204 and replay the stored voice information. After this, the microcontroller 208 will monitor the line to see if the user answers the call or not. Depending on whether or not the user answers the call, as determined by the hook sensing circuit 211, the status of the call is noted and the microcontroller will update the new call entry into the call information memory 209. To store a name against the received telephone number, the user will press any option key on keypad 202 at which time microcontroller prompts for a name input using display unit 201. In the usual manner, the telephone subscriber will enter the name and number. These numbers are cross-referenced to the existing entries by the microcontroller 208 to make sure there are no conflicts. If there is no conflict, the microcontroller 208 will update this entry to the non-volatile memory 209. To input voice information, the user will press a "record" key at the keypad 202 after which microcontroller 208 will recognize this and issue a command to recording portion of 204, instructing it to record. The starting address and ending address of recording information are supplied by the microcontroller to update a new entry. When the user speaks a name, this name will be captured by microphone 206 extended into the recording portion of 204 fed by means of the logic circuitry included therein, the logic which includes an A/D converter will convert the information to serial digital signal and store it in the specified memory, i.e., 209.

In order to communicate with personal computers, this unit keeps monitoring the state of the control register in the PC interface 203. If there is a read command present on the control register portion of 203, then microcontroller 208 will read the information, such as dial digits, the index and memory, etc. However, if there is a write command, it will then write the caller identification data into the data register portion of PC interface 203. During the process of read and write from the data register included in PC interface 203, the user may utilize the control register also included therein to exercise the handshake maneuver with an associated personal computer (not shown). This prevents any conflict on who has the current use of the data register portion of the PC interface 203.

The television interface can be either integrated directly into a television set circuit or can be operated from a serial port, the serial port 213 is a standard RS232 interface. This interface provides caller identification data extracted by the microcontroller 208 to the television interface. The controller module 214 in the television interface is responsible for channel selection, serial interface control, video demodulation and modulation. The demodulator 216 extracts the video signal for mixer 217, depending on channel input from control module 214 the modulator and mixer 217 section mixes video signals from the on screen display unit and demodulator section with an RF signal as television input. The on screen display unit controller 215 generates display information for the television set depending on signals received from the control module.

The serial interface 213, control block 214, and on screen display unit 215 together form a module which can be directly integrated to the television circuit. This module, along with modulator 217, demodulator 216 form an integral part of the present universal caller identification device.

When the device receives caller identification data, routes data through serial interface to the television module, this module converts this data into a video signal and mixes it with the selected videl channel signal and sends it to the television.

Whenever there is a call the speakerphone circuit 212, which is a commercially available integrated circuit, can be activated by pressing a key on the keypad 202, using microphone 206 and speaker 205 the user can communicate with the calling party. Two keys on the keypad adjust the volume of conversation. During origination of a call a user can dial using dialer 207 and use the speaker and microphone to monitor and converse with the distant party.

While but a single embodiment of the present invention has been shown, it will be obvious to those skilled in the art that numerous modifications may be made without departing from the spirit of the present invention which shall be limited only by the scope of the claims appended hereto.

What is claimed is:

1. An interface circuit for use between a telephone central office and a subscriber's telephone instrument for identifying the source of an incoming call, including control means, display means connected to said control means operated in response to signals representative of the identity of the source of said incoming call received from said telephone central office via a telephone line, to provide a visual indication of said incoming call identification, and a calling device connected to said control means operable by a subscriber to operate said control means to transmit via said telephone line, call selection signals, the improvement comprising:

a dialer circuit connected between said control means and said telephone line;

sensing means connected between said telephone line and said control means operated to indicate to said control means the condition of said telephone line;

decoder means connected between said telephone line and said control means, operated to decode incoming signals and extend decoded information representative of said incoming signals to said control means;

a loudspeaker;

recording and reproducing means connected between said loudspeaker and said control means, operated in response to said decoded information received from said control means to reproduce audibly the identification of the source of said incoming call;

a microphone connected to said recording and reproducing means, said microphone and said recording and reproducing means operated by a subscriber to program in a voice memory associated with said recording and reproducing means, information related to the identity of the source of an incoming telephone call; and a computer interface connected between said control means and a computer, said decoded information extended via said computer interface to said computer.

2. An interface circuit as claimed in claim 1 wherein: computer interface circuit is of the RS232 industry standard type.

3. An interface circuit as claimed in claim 1 wherein: there is further included television display means connected between said control means and a television set operated in response to decoded information from said control means to operate a screen associated with said television set to indicate the identification of the source of said incoming call.

4. An interface circuit as claimed in claim 3 wherein: said television display means comprises a serial interface connected to said control means, channel selection logic and controller means connected to said serial interface, said channel selection logic including connections to an on-screen display controller and to a demodulator, said demodulator connected to an external antenna to receive incoming signals for extension through a mixer and modulator to said associated television display means;

said on-screen display controller including circuit connections between said channel selection logic and said mixer and modulator.

5. An interface circuit as claimed in claim 1 wherein:

said computer interface between said computer and said control means includes an address decoder, a control register, and a data register.

6. An interface circuit as claimed in claim 1 wherein:

there is further included a voice activated speakerphone including circuit connections to said telephone line, to said control means and including a circuit connection to said recording and reproducing means;

said voice activated speakerphone programmed via said control means by said subscriber to be operable when subscriber is not directly at said subscriber's telephone instrument, whereby in response to a receipt of audible identification of the source of said incoming call, said subscriber may converse and respond to said incoming call via said voice activated speakerphone.

7. An interface circuit as claimed in claim 1 wherein:

said computer in response to said decoded information received from said control means via said computer interface, will cause supplemental information related to the identity of the source of incoming call to be displayed.

8. An interface circuit as claimed in claim 1 wherein:

there is further included an additional memory connected to said control means;

said additional memory storing supplemental information related to the identity of the source of selected incoming calls.

9. An interface circuit as claimed in claim 8 wherein:

in response to receipt of decoded information received from said control means, said supplemental information is drawn from said additional memory;

said control means further operated in response to said supplemental information to cause said supplemental information to be reproduced audibly by said reproducing means or in the alternative to be reproduced visually by said display means.

* * * * *